W. C. SHINN

LOCK

Jan. 20, 1931.

Re. 17,936

Original Filed May 6, 1929

Inventor:
William C. Shinn
By Fred Gerlach
his Atty.

Reissued Jan. 20, 1931

Re. 17,936

UNITED STATES PATENT OFFICE

WILLIAM C. SHINN, OF CHICAGO, ILLINOIS, ASSIGNOR TO CHICAGO LOCK COMPANY, OF CHICAGO, ILLINOIS, A CORPORATION OF ILLINOIS

LOCK

Original No. 1,761,092, dated June 3, 1930, Serial No. 360,891, filed May 6, 1929. Application for reissue filed October 29, 1930. Serial No. 492,003.

The invention relates to locks.

In equipping automobiles with locks for the different elements which are to be lock-controlled, such as the doors, the transmission, the ignition switch and the tire carrier, it is desirable to provide a set of locks, all of which are controlled by one key. A desideratum in installations of the aforementioned character is to provide casings which may be built in as permanent parts of the elements and to provide a construction which permits them to be built into the elements at the place of manufacture. For example, it is preferable to build the casing for the transmission lock into the transmission at the place of manufacture, so that the installation of the key-controlled plug may be made when the automobile has been assembled. By building the casings into or as permanent parts of the various elements placement of a set of locks having the same key combination is facilitated by reason of the fact that the locks may be installed after the automobile has been assembled.

One object of the invention is to provide an improved lock which permits the casing to be separately installed and the plug to be selected and readily inserted into the casing after the latter has been built into the element, and in which the plug is secured in the casing by a spring-pressed device at the inner end of the lock which is operable to release the plug by a tool insertable from the outer end of the lock.

Another object of the invention is to provide a lock which is generally of new and improved construction, may be manufactured at a comparatively low cost and is an improvement upon that disclosed in an application filed by me November 22, 1928, Serial No. 321,076.

Other objects of the invention and the various advantages and characteristics of the present lock construction will be apparent from a consideration of the following detailed description.

The invention consists in the several novel features hereinafter set forth and more particularly defined by claims at the conclusion hereof.

In the drawing which accompanies and forms a part of this specification or disclosure and in which like numerals of reference denote corresponding parts throughout the several views.

Figure 1:
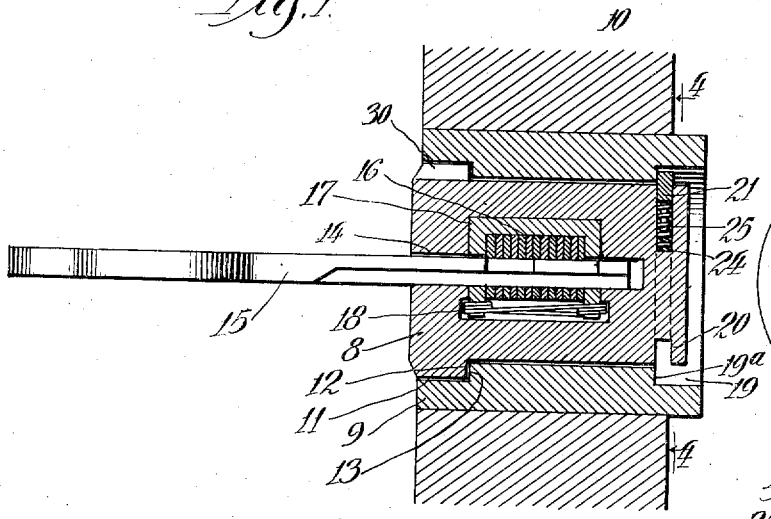
Fig. 1 is a vertical longitudinal section of a lock embodying the invention.
Figure 2:
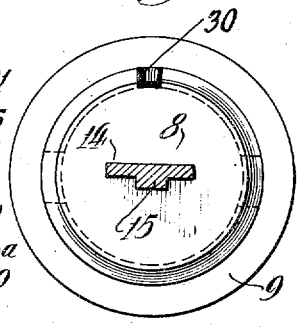
Fig. 2 is a front elevation, the key being shown in section.
Figure 3:
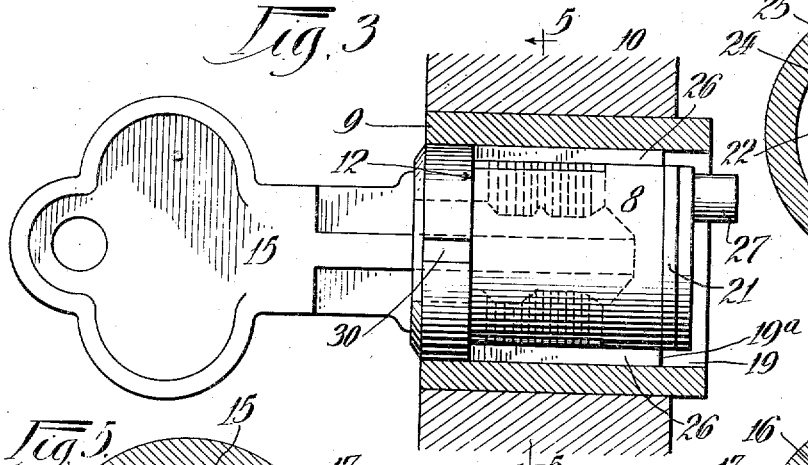
Fig. 3 is a horizontal section, the plug being shown in elevation.
Figure 4:
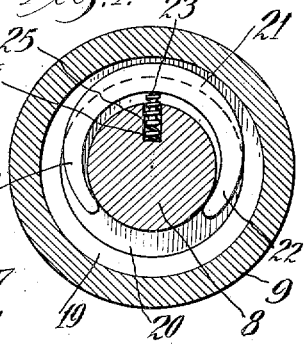
Fig. 4 is a section on line 4—4 of Fig. 1.
Figure 5:
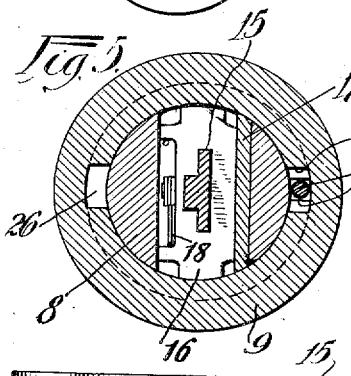
Fig. 5 is a section on line 5—5 of Fig. 3, the plug being shown in position to permit it to be released for removal from the casing.
Figure 6:
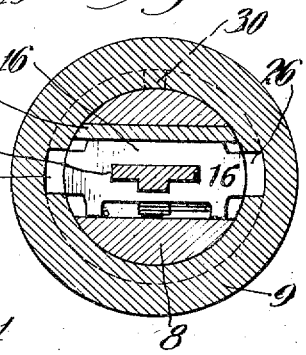
Fig. 6 is a similar section showing the plug locked against rotation.
Figure 7:
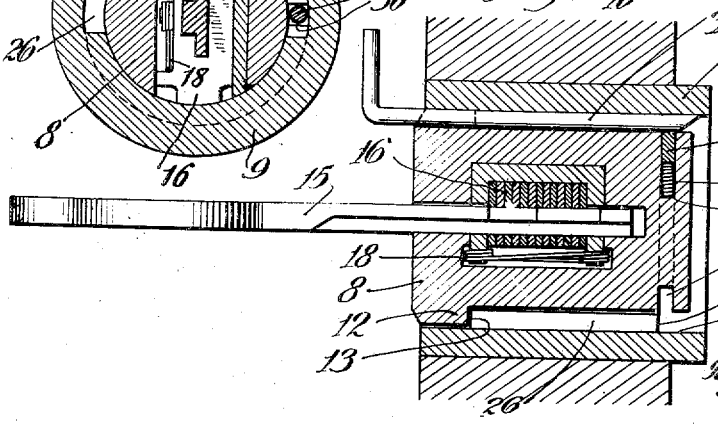
Fig. 7 is a longitudinal section of the plug and casing showing the tool inserted through the plug and casing for releasing the plug-retaining device.

The invention is exemplified in a lock which is of the type set forth in Patent No. 1,644,092 and comprises a centrally bored casing 9 which is rigidly secured to or built as a part of an element 10, such as a wall or door, and a cylindrical plug 8, which is rotatable in the casing. The outer end of the plug is flanged so as to provide an annular shoulder 12 which fits in a recess 11 in the casing and against a corresponding shoulder 13 in the casing. A slot 14 for a key 15 is formed in the plug 8. A series of slidable plate tumblers 16 are provided with slots through which the key may pass, and have their outer ends adapted to be aligned at the periphery of the plug when the correct key is inserted to permit the plug to be rotated by the key. The entire series of tumblers is slidably held in a frame 17 and is acted upon by a spring 18 to press the tumblers radially outward. For a more detailed description of the tumblers, frame and spring, and the operation of the tumblers, reference may be had to the aforesaid Patent No. 1,644,092. A stud 27 formed on the inner end of plug 8, is adapted to control the operation of a bolt or other locking element, as well understood in the art.

The casing is formed with diametrically opposite, longitudinal recesses 26, into which the outer ends of the tumblers pass to lock the plug against rotation, when the latter is in one position. The key is adapted to withdraw the tumblers from the recesses to permit the plug to be turned to release the lock-controlled device.

An annular groove 19 is formed in the inner periphery of the inner end of the casing 9, and a continuous annular groove 20 registering with the groove 19, is formed in the outer periphery of the plug 8. A retaining device 21 is positioned in these grooves and is adapted to hold the plug against withdrawal from the casing. This holding device is preferably stamped of plate metal and is provided with inwardly curved arms 22 which are adapted to retain the holding device in connected relation to the plug, and to limit the outward radial movement of the device. The holding device is provided with an integral central stem 23 which extends into a radial recess 24 formed in the plug. A coil spring 25, seated in said recess, extends around said stem and bears against the holder to force its central portion outwardly, so that it will normally extend into the groove 19 in the casing and lap the shoulder 19ª to secure the plug against outward withdrawal from the casing, and will thus serve to lock the plug in the casing while permitting the plug to be rotated by the key.

In assembling the lock, the holding device 21 can be manually pressed inwardly so it will be confined within groove 20 of the plug while the latter is passed inwardly through the front end of the casing, and until said device passes in back of shoulder 19ª, whereupon the spring 25 will press the holding device outwardly to lock the plug against withdrawal from the casing. For the purpose of permitting the holding device 21 to be moved inwardly to release the plug from the casing for the substitution of a plug with one set of tumblers for another, a groove 30 extends longitudinally through shoulder 12 of the plug. When groove 30 in the plug is in longitudinal alignment with one of the recesses 26 in the casing, a suitable tool or device, such as a wire 33, may be inserted from the front of the lock through said groove and said one recess to engage the outer edge of the holding device 21 and force it inwardly against the force of spring 25 and completely into the groove 20 in the plug, so that the plug and parts carried thereby can be withdrawn through the front of the casing. Groove 30 is preferably correlatively positioned with respect to the tumblers, so it will register with a recess 26 in the casing only when the tumblers have been withdrawn from recesses 26 by the key and the plug is rotated by the key from its locking position. As a result, the plug can be released for withdrawal from the casing only when the correct key has been inserted and the tumbler rotated in the casing to bring the groove 30 into longitudinal alignment with one of the recesses 26, to permit the insertion of the device 33. At all other times said recesses will be out of registry so that the plug cannot be released for withdrawal. The inner end of device 33 is bevelled to force the holding device 21 inwardly when the device has been inserted.

As a result of this construction, it becomes possible to build casings into the elements to be controlled or locked and to install a corresponding set of tumbler-equipped plugs having the same key combinations if desired, without installing the plugs at places where the casings are built into the elements. A characteristic of the construction is that the plug-retaining device is disposed at the inner end of the plug and casing and is operable by the insertion of a device from the outer end of the lock. This makes it possible to release the plug from the outer end of the lock in installations where the inner end of the lock is inaccessible.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a lock, the combination of a casing adapted to be secured in an element, a plug rotatable in and insertable endwise into the casing, key-operable tumblers for locking the plug in the casing, said casing and plug having grooves adjacent their inner ends, a holding device in the groove in the plug and adapted to extend into the groove in the casing to secure the plug against withdrawal from the casing, and means to permit a releasing device to pass through the front end of the lock to release the holding device.

2. In a lock, the combination of a casing adapted to be secured in an element, a plug rotatable in and insertable endwise into the casing, key-operable tumblers for locking the plug in the casing, said casing and plug having grooves adjacent their inner ends, a spring-pressed holding device in the groove in the plug and adapted to extend into the groove in the casing to secure the plug against withdrawal from the casing, and means to permit a releasing device to be inserted through the front end of the lock to release the holding device.

3. In a lock, the combination of a casing adapted to be secured in an element, a plug rotatable in and insertable endwise into the casing, key-operable tumblers for locking the plug in the casing, said casing and plug having grooves adjacent their inner ends, a holding device in the groove in the plug and adapted to extend into the groove in the casing to secure the plug against withdrawal from the casing, and means to permit a releasing device to be inserted through the front end of the lock to release the holding device only when the tumblers are withdrawn into the plug by the key and said plug is shifted into its unlocked position.

4. In a lock, the combination of a casing adapted to be secured in an element, a plug rotatable in and insertable endwise into the casing, key-operable tumblers for locking the plug in the casing, said casing and plug having grooves adjacent their inner ends, a spring-pressed crescent-shaped holding plate in the groove in the plug and adapted to extend into the groove in the casing to secure the plug against withdrawal from the casing, and means for permitting insertion of a releasing device through the front end of the lock to release the holding device.

5. In a lock, the combination of a casing adapted to be secured in an element, a plug rotatable in and insertable endwise into the casing, the plug being provided with an annular shoulder and the casing with an annular recess for the shoulder at the front end, key-operable tumblers for locking the plug in the casing, and a holding device at the inner end of the plug for securing it against withdrawal from the casing, the shoulder and casing being provided with grooves adapted to be aligned for the insertion of a device to release the retaining device.

6. In a lock, the combination of a casing adapted to be secured in an element, a plug rotatable in and insertable endwise into the casing, the plug being provided with an annular shoulder and the casing with an annular recess for the shoulder at the front end, key-operable tumblers for locking the plug in the casing, and a spring-pressed holding device at the inner end of the plug for securing it against withdrawal from the casing, the shoulder and casing being provided with longitudinal grooves adapted to be aligned for the insertion of a device to release the retaining device.

7. In a lock, the combination of a casing adapted to be secured in an element, a plug rotatable in and insertable endwise into the casing, the plug being provided with an annular shoulder and the casing with an annular recess for the shoulder at the front end, key-operable tumblers for locking the plug in the casing, and a spring-pressed holding device at the inner end of the plug for securing it against withdrawal from the casing, the shoulder and casing being provided with longitudinal grooves adapted to be aligned for the insertion of a device to release the retaining device only when the tumblers are withdrawn by the key and said plug is shifted into its unlocked position.

8. In a lock, the combination of a casing adapted to be secured in an element, a plug rotatable in and insertable endwise into the casing, the plug being provided with an annular shoulder and the casing with an annular recess for the shoulder at the front end, key-operable tumblers for locking the plug in the casing, and a spring-pressed crescent-shaped holding plate at the inner end of the plug for securing it against withdrawal from the casing, the shoulder and casing being provided with grooves adapted to be aligned for the insertion of a tool to release the retaining device.

9. In a lock, the combination of a casing adapted to be secured in an element, a plug rotatable in and insertable endwise into the casing, key-operable tumblers for locking the plug in the casing, said plug having a groove adjacent its inner end, a holding device in the groove and adapted to extend into engagement with the casing to secure the plug against withdrawal from the casing, and means to permit a releasing device to pass from the front end of the lock to the rear or innner end for the purpose of releasing the holding device.

10. In a lock, the combination of a casing, a cylindrical plug insertable endwise into and rotatable in the casing and embodying a key slot at the front end thereof, key-operable tumblers mounted in and movable transversely of the plug and adapted to lock the plug against rotation in the casing, a releasable element between the plug and the casing for securing the plug against withdrawal from said casing, and means forming a passage independent of the key slot whereby a tool may be inserted through the front end of the lock to control the element so as to free the plug for withdrawal from the casing.

11. In a lock, the combination of a casing, a cylindrical plug insertable endwise into and rotatable in the casing and embodying a key slot at the front end thereof, key-operable tumblers mounted in and movable transversely of the plug and adapted to lock the plug against rotation in the casing, a releasable element between the plug and the casing for securing the plug against withdrawal from said casing, and means forming a passage whereby a tool may be inserted between the plug and the casing and shifted longitudinally of the plug to control the element so as to free the plug for withdrawal from the casing.

12. In a lock, the combination of a casing, a cylindrical plug insertable endwise into and rotatable in the casing and embodying a key slot at the front end thereof, key-operable tumblers mounted in and movable transversely of the plug and adapted to lock the plug against rotation in the casing, and a releasable element between the plug and the casing for securing the plug against withdrawal from the casing, said plug having a longitudinal passage therein independent and at one side of the key slot and through which may be inserted a tool for controlling the removal of the plug from the casing.

13. In a lock, the combination of a casing, a cylindrical plug insertable endwise into and rotatable in the casing and embodying a substantially flat front face and a key slot in said face, key-operable tumblers mounted in and movable transversely of the plug and adapted to lock the plug against rotation in the casing, and a releasable element between the plug and the casing for securing the plug against withdrawal from the casing, said plug having a longitudinal passage therein, independent of and at one side of the key slot and extending through the front face, whereby a tool for controlling the removal of the plug from the casing may be inserted through the front of the plug.

14. In a lock, the combination of a casing, a cylindrical plug insertable endwise into and rotatable in the casing and embodying a key slot at the front end thereof, key-operable tumblers mounted in and movable transversely of the plug and adapted to lock the plug against rotation in the casing, a retractable holder-element between the plug and the casing for limiting movement of the plug in one direction with respect to the casing, and means forming a longitudinal passage whereby a tool may be inserted between the plug and the casing to shift the element into its retracted position so as to free the plug for movement in said one direction.

15. In a lock, the combination of a casing, a cylindrical plug insertable endwise into and rotatable in the casing and embodying a substantially flat front face and a key slot in said face, key-operable tumblers mounted in and movable transversely of the plug and adapted to lock the plug against rotation in the casing and a retractable holder-element between the plug and the casing for limiting movement of the plug in one direction with respect to said casing, said plug having a longitudinal passage therein, independent of and at one side of the key slot and extending through the front face, whereby a tool may be inserted to shift the holder-element into its retracted position so as to free the plug for movement in one direction.

16. In a lock, the combination of a casing, a cylindrical plug insertable endwise into and rotatable in the casing and provided with an annular flange at the front end thereof and a key slot in its front face, key-operable tumblers mounted in and movable transversely of the plug and adapted to lock the plug against rotation in the casing, and a releasable element between the plug and the casing for securing the plug against withdrawal from said casing, the flange of the plug having a passage formed therein through which may be inserted a tool for controlling the removal of the plug from the casing.

17. In a lock, the combination of a casing, a cylindrical plug insertable endwise into and rotatable in the casing and provided with an annular flange at the front end thereof and a key slot in its front face, key-operable tumblers mounted in and movable transversely of the plug and adapted to lock the plug against rotation in the casing, and a retractable holder-element between the plug and the casing for limiting movement of the plug in one direction with respect to the casing, the flange of the plug having a groove therein through which a tool may be inserted to shift the element into its retracted position so as to free the plug for movement in said one direction.

18. In a lock, the combination of a casing having a bore extending longitudinally therethrough, a cylindrical plug insertable endwise into and rotatable in the bore of the casing and embodying a key slot at the front end thereof, key-operable tumblers mounted in and movable transversely of the plug and adapted to lock the plug against rotation in the casing, said casing having longitudinal grooves along the bore for receiving the ends of the tumblers when the plug is in its locked and unlocked positions, a releasable element at the rear end of the lock and extending between the plug and casing for securing the plug against withdrawal from said casing, and means forming a passage whereby a tool for controlling the removal of the plug from the casing may be inserted from the front end of the lock through one of the grooves for the purpose of controlling the element so as to free the plug for withdrawal from the casing.

Chicago, Illinois, October 25th, 1930.

WILLIAM C. SHINN.